United States Patent
Takaoka et al.

(10) Patent No.: US 6,474,147 B2
(45) Date of Patent: Nov. 5, 2002

(54) EXHAUST-GAS PURIFICATION DEVICE FOR INTERNAL COMBUSTION ENGINE

(75) Inventors: Nobuaki Takaoka, Saitama (JP); Hiroshi Oono, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/567,047

(22) Filed: May 8, 2000

(65) Prior Publication Data

US 2002/0116991 A1 Aug. 29, 2002

(30) Foreign Application Priority Data

May 17, 1999 (JP) ............................................ 11-135344

(51) Int. Cl.$^7$ ................................................. F01N 3/00
(52) U.S. Cl. ..................................... 73/118.1; 73/23.32
(58) Field of Search ............................ 73/23.31, 23.32, 73/116, 117.2, 117.3, 118.1

(56) References Cited

U.S. PATENT DOCUMENTS

| | | | |
|---|---|---|---|
| 5,381,657 A | 1/1995 | Takizawa et al. | 60/276 |
| 5,577,382 A * | 11/1996 | Kihara et al. | 60/276 |
| 6,336,320 B1 * | 1/2002 | Tanaka et al. | 123/443 |
| 6,338,243 B1 * | 1/2002 | Takaoka et al. | 60/276 |
| 6,397,586 B1 * | 6/2002 | Sakurai et al. | 60/285 |

FOREIGN PATENT DOCUMENTS

| | | | |
|---|---|---|---|
| EP | 0 727 568 A1 | 8/1996 | |
| EP | 0 903 478 A2 | 3/1999 | F01N/3/08 |
| JP | 10-299460 | 11/1998 | F01N/3/20 |

OTHER PUBLICATIONS

Japanese Abstract No. 10299460 dated Nov. 10, 1998.

* cited by examiner

*Primary Examiner*—Eric S. McCall
(74) *Attorney, Agent, or Firm*—Sughrue Mion, PLLC

(57) ABSTRACT

A proportional oxygen sensor, a three-way catalyst, a binary O2 sensor, a NOx purification device, and a binary O2 sensor are positioned in the named order in the exhaust system of an internal combustion engine. A correction coefficient KMON2, which is set in accordance with the degree of deterioration of a three-way catalyst, is used to correct the timer value tmMON2 used to measure the time extending from the time at which the output of the O2 sensor is changed when the air-fuel ratio is increased, until the time at which the output of the O2 sensor is changed. When the corrected timer value tmMON2 is smaller than a reference time TNOxREF, it is ascertained that deterioration of the NOx purification device has occurred.

14 Claims, 7 Drawing Sheets

EXHAUST-GAS PURIFICATION DEVICE FOR INTERNAL COMBUSTION ENGINE

BACKGROUND OF THE INVENTION

1. Field of the Invention

The present invention relates to an exhaust-gas purification device for an internal combustion engine, and relates in particular to an exhaust-gas purification device that includes a three-way catalyst and a nitrogen oxide purification device for purifying of nitrogen oxide, and that has a function for evaluating the deterioration of the nitrogen oxide purification device.

2. Description of the Related Art

When the air-fuel ratio of the fuel mixture supplied to an internal combustion engine is set leaner than the theoretical air-fuel ratio (a so-called lean operation is executed), the volume of the nitrogen oxide (hereinafter called "NOx") that is discharged with the exhaust gases tends to increase. Therefore, in accordance with a conventional, well known technique, to remove NOx from the exhaust, a purification device that incorporates a NOx absorbent is provided for the exhaust system of an internal combustion engine. The material that is employed as the NOx absorbent has the following characteristics: when the air-fuel ratio is set so that a leaner mixture is supplied than one that is theoretically correct, and the oxygen content of the exhaust gases is comparatively high (the exhaust contains a high percentage of NOx) (a condition hereinafter referred to as a lean exhaust-gas condition), NOx is absorbed, while when the air-fuel ratio is set so that a richer mixture is supplied than the theoretically correct one, and the oxygen content of the exhaust gases is comparatively low (a condition hereinafter referred to as a rich exhaust-gas condition), NOx is discharged. The NOx purification device that incorporates such an NOx absorbent is so designed that, during a rich exhaust-gas condition, the NOx released by the NOx absorbent is reduced by HC and CO and is discharged as nitrogen gas, while the HC and CO are oxidized and are discharged as steam and carbon dioxide.

The volume of the NOx that the NOx absorbent can remove is naturally limited, and this limited value tends to become smaller as the NOx absorbent deteriorates. Therefore, a well known conventional method for evaluating the condition of the NOx absorbent has been disclosed (JP-A-10-299460). In this publication, oxygen sensors are provided upstream and downstream of the NOx absorbent device, and the air-fuel ratio is increased in order to discharge the NOx that is held by the NOx absorbent. The deterioration of the NOx absorbent is then determined by measuring the time that elapses from the time at which the value of a reading obtained by the upstream oxygen sensor indicates a rich air-fuel ratio, until the value of a reading obtained by the downstream oxygen sensor is representative of the rich air-fuel ratio.

Lean internal combustion engine operations are not constantly employed, and in accordance with the operating condition, stoich operations, for which the theoretical air-fuel ratio is set, or rich operations, for which the air-fuel ratio that is set is leaner than the theoretical air-fuel ratio, are also performed. Therefore, normally, not only is a NOx purification device employed, but also a three-way catalyst having an oxide reduction function. When a three-way catalyst is employed, since it must be activated as early as possible after the engine is started, the catalyst is positioned so it is nearer the combustion chamber of the engine than the NOx purification device, which is located downstream of the three-way catalyst because the NOx absorbent has low heat resistance. Thus, the following problem is encountered with the conventional method.

When deterioration of a three-way catalyst has occurred, and when the air-fuel ratio is changed from a lean air-fuel ratio to a rich air-fuel ratio, the time at which, downstream of the three-way catalyst, the reduction of oxygen density is required to be performed is earlier, and the densities of the HC and the CO that perform the reduction function are increased. Therefore, the time required for the reduction changes, even through the volume of the NOx absorbed by an NOx absorbent is the same, and a precise evaluation of the deterioration of an NOx purification device can not be performed.

SUMMARY OF THE INVENTION

It is an object of the present invention to provide an exhaust gas purification device that can perform a precise evaluation of the deterioration of an NOx purification device, even when it is located downstream of a three way catalyst.

To achieve the above object, according to a first aspect of the invention, an exhaust-gas purification device, which is provided for the exhaust system of an internal combustion engine, comprises:

nitrogen oxide purifying means for absorbing nitrogen oxide in exhaust gases in a lean exhaust-gas condition;

a three-way catalyst, which is provided upstream of said nitrogen oxygen purifying means;

a first oxygen sensor, which is provided between said nitrogen oxide purifying means and said three-way catalyst, for detecting the oxygen density in said exhaust gases;

a second oxygen sensor, which is provided downstream of said nitrogen oxygen purifying means, for detecting said oxygen density in said exhaust gas;

first deterioration determination means, for evaluating the deterioration of said three-way catalyst; and second deterioration determination means, for evaluating the deterioration of said nitrogen oxide purifying means, based on the deterioration of said three-way catalyst and a first determination time period, after a lean air-fuel ratio of the exhaust gas has been shifted to a rich air-fuel ratio by an decrease in the air-fuel ratio of a mixture to be supplied to the internal combustion engine, from a time at which the value output by first oxygen sensor changes to a value indicating a rich air-fuel ratio until the value output by said second oxygen sensor changes to a value indicating a rich air-fuel ratio.

With this arrangement, the deterioration of the nitrogen oxide purifying means is evaluated based on the deterioration of the three-way catalyst and the first determination time extending from the time at which, after a lean exhaust gas mixture has been shifted to a rich air-fuel gas condition by an increase in the air-fuel ratio of a mixture to be supplied to the internal combustion engine, the value output by the first oxygen oxide sensor changes to one indicative of a rich air-fuel ratio, until the value output by the second oxygen sensor also changes until it is indicative of a rich air-fuel ratio. Therefore, an evaluation of the deterioration of the nitrogen oxide purifying means can be obtained, regardless of the degree to which the three-way catalyst has been deteriorated.

According to a second aspect of the invention, the exhaust-gas purification device for an internal combustion engine of the first aspect further comprises a third oxygen sensor, which is provided upstream of the three-way catalyst, for detecting the oxygen density in the exhaust gases. The first deterioration means evaluates the degree of deterioration of the three-way catalyst, based on a second determination time, which extends, after the lean exhaust gas has been shifted to the rich air-fuel ratio, from a time at which a value output by the third oxygen sensor is changed to a value indicative of the rich air-fuel ratio until the value output by said first oxygen sensor is changed to a value indicative of the rich air-fuel ratio.

According to this arrangement, an evaluation of the deterioration of the three-way catalyst is obtained, based on the second determination time, which extends from the time at which the air-fuel ratio is increased and the value output by the third oxygen sensor is changed to a value indicative of a rich air-fuel ratio, until the output value of the first oxygen sensor is also changed to a value indicative of a rich air-fuel ratio. Therefore, not only the deterioration of the nitrogen oxide purifying means can be evaluated, but also the deterioration of the three-way catalyst can be evaluated, and at the same time.

It is preferable that the second deterioration determination means correct the first determination time that it is extended as a result of the three-way catalyst being greatly deteriorated, and that when the corrected first determination time is shorter than a reference time, the second deterioration determination means determine that the nitrogen oxide purifying means has been deteriorated. Alternatively, the second deterioration means may correct the reference time so that it is reduced as a consequence of the three-way catalyst being greatly deteriorated, and, when the first determination time is shorter than the corrected reference time, the second deterioration determination means may determine that deterioration of the nitrogen purifying means has occurred. The reference time is set so it equals a time that corresponds to the time required when the purifying capacity of a nitrogen oxide purifying means is reduced until it is approximately 50% that of a brand new product.

PREFERRED EMBODIMENTS OF THE INVENTION

Figure 1:
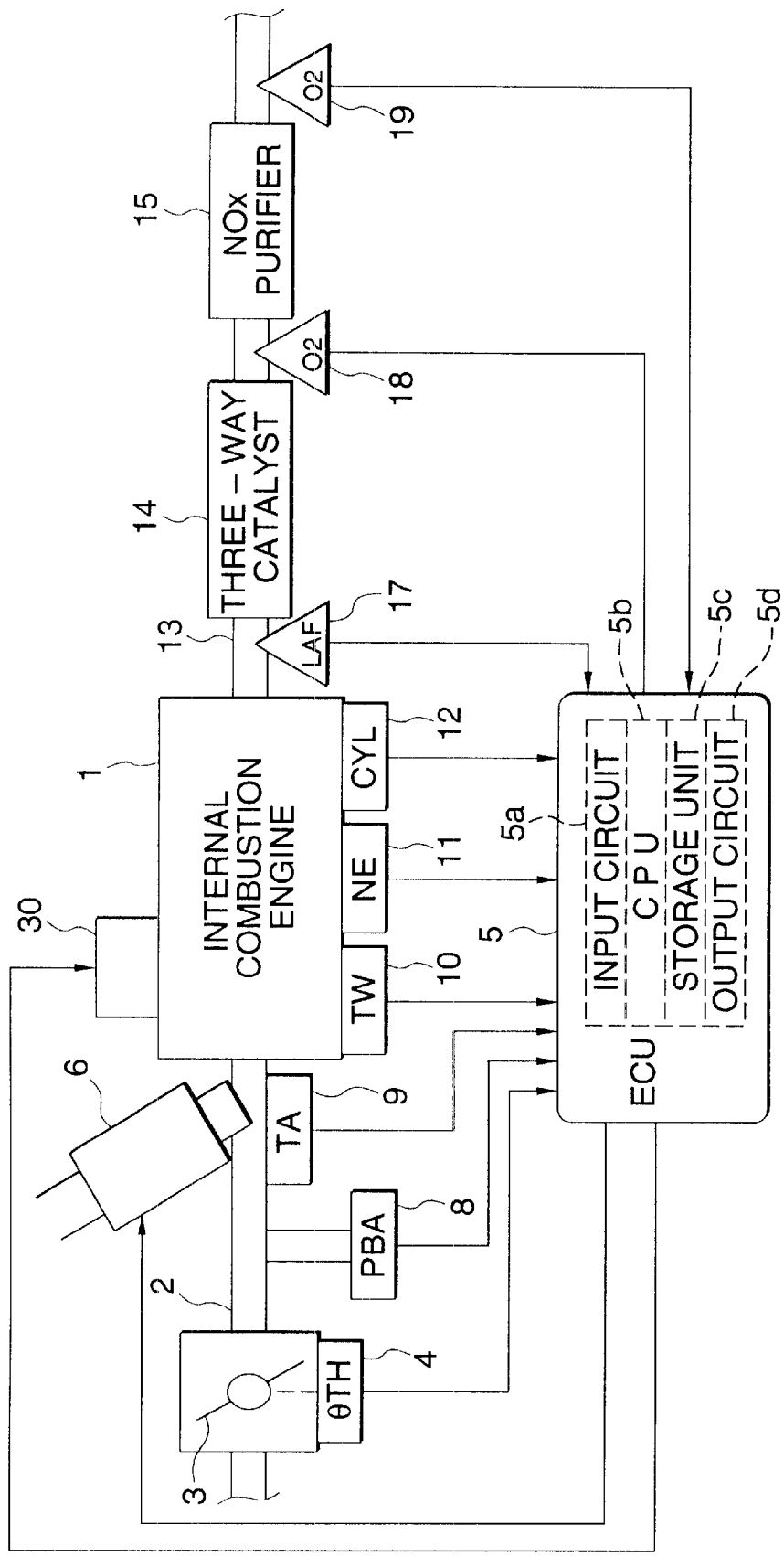
FIG. 1 is a diagram showing an arrangement for an internal combustion engine and a controller according to one embodiment of the invention.

The preferred embodiment of the invention will now be explained while referring to the drawings.

FIG. 1 is a diagram showing the overall arrangement of an internal combustion engine (hereinafter referred to as an "engine"), which includes an exhaust-gas purification device according to one embodiment of the invention and a controller therefor. A throttle valve 3 is located along the route of an air intake pipe 2 of a four-cylinder engine 1. The throttle valve 3 is connected to a throttle valve open-degree (θTH) sensor 4, and an electric signal that represents the open-degree of the throttle valve 3 is output by the sensor 4 to an engine control electronic control unit (hereinafter referred to as an "ECU") 5.

A fuel injection valve 6 is provided, for each cylinder, between the engine 1 and the throttle valve 3 and a little upstream of the air intake valve (not shown) of the air intake pipe 2. Each fuel injection valve 6 is connected to a fuel pump (not shown), and is electrically connected to the ECU 5, so that the time required to open the fuel injection valve 6 is controlled in accordance with a signal from the ECU 5.

An absolute air intake pipe internal pressure (PBA) sensor 8 is positioned as a load detection means immediately downstream of the throttle valve 3. An absolute pressure signal is converted by the absolute pressure sensor 8 into an electric signal, which is transmitted to the ECU 5. An intake air temperature (TA) sensor 9, which is located downstream of the sensor 8, detects an intake air temperature TA, and outputs a corresponding electric signal to the ECU 5.

An engine water temperature (TW) sensor 10, which is mounted to the main body of the engine 1, is constituted by a thermister. The sensor 10 detects an engine water temperature (cooling water temperature) TW and outputs a corresponding electric signal to the ECU 5.

An engine revolution (NE) sensor 11 and a cylinder identification (CYL) sensor 12 are provided on the peripheries of the camshaft and the crankshaft (not shown) of the engine 1. Concerning the upper dead point (TDC), when each cylinder of the engine 1 begins its intake stroke, the engine revolution sensor 11 outputs a TDC signal pulse at a crank angle (each crank angle of 180° for the four-cylinder engine) that is smaller than a predetermined crank angle. The cylinder identification sensor 12 outputs a cylinder identification signal pulse at a predetermined crank angle for a specific cylinder, and each signal pulse is transmitted to the ECU 5.

A three-way catalyst 14 and a NOx purification device 15, which is a nitrogen oxide purifying means, are positioned, in the named order, upstream along an exhaust pipe 13.

The three-way catalyst 14 has an oxygen storage capacity. In a lean exhaust-gas condition, when the air-fuel ratio of a mixture to be supplied to the engine 1 is set leaner than the theoretical air-fuel ratio, and the oxygen density in the exhaust gas is comparatively high, the three-way catalyst 14 stores oxygen in the exhaust gases. In the rich exhaust-gas condition, when the air-fuel ratio of the air mixture to be supplied to the engine 1 is set richer than the theoretical air-fuel ratio, the oxygen density in the exhaust gas is low, and the HC and CO elements are rich, the three-way catalyst 14 uses oxygen to oxidize the HC and the CO contained in the exhaust gases.

The NOx purification device 15 incorporates a NOx absorbent for absorbing NOx, and a catalyst for promoting oxidization and reduction. The NOx absorbent can be an absorption/storage type or an absorption/reduction type. The first absorbent type absorbs the NOx in the lean exhaust-gas condition wherein the air-fuel ratio of the air mixture to be supplied to the engine 1 is set leaner than the theoretical air-fuel ratio, and wherein the oxygen density in the exhaust gas is comparatively high (much NOx is contained), while the absorbent discharges NOx that has been absorbed in a rich exhaust-gas condition, wherein the air-fuel ratio of the mixture to be supplied to the engine 1 is set so that it equals or exceeds the theoretical air fuel-ratio, and wherein the oxygen density in the exhaust gas is comparatively low. The second absorbent absorbs NOx in the lean exhaust-gas condition, and reduces NOx in the rich exhaust-gas condition. The NOx purification device 15 is so designed that the NOx absorbent absorbs NOx in a lean exhaust-gas condition, and discharges NOx, in a rich exhaust-gas condition, from the NOx absorbent that is reduced by HC and CO and is discharged as a nitrogen gas, while the CO is oxidized and is discharged as steam and dioxide. Ballium oxide (BaO), for example, is used as the NOx absorbent of an absorption/storage type, while sodium (Na) and titanium (Ti), or strontium (Sr) and titanium (Ti), are employed as the NOx absorbent of an absorption/reduction type. A noble metal, such as rhodium (Rh), palladium (Pd) or Platinum (Pt), is employed as a catalyst for the absorption/storage type or for the absorption/reduction type.

When NOx is absorbed, up to the limit of the NOx absorption capacity of the NOx absorbent, i.e., the maximum NOx absorption volume, no more NOx can be absorbed. Therefore, the air-fuel ratio is increased, i.e., a reduction increase is performed, in order to discharge the NOx as needed for reduction.

A proportional air-fuel ratio sensor (hereinafter referred to as an "LAF sensor") 17 is arranged upstream of the three-way catalyst 14. The LAF sensor 17 outputs, to the ECU 5, an electric signal that is substantially proportional to the oxygen density (air-fuel ratio) of the exhaust gas.

Binary oxygen sensors (hereinafter referred to as "O2 sensors") 18 and 19 are arranged between the three-way catalyst 14 and the NOx purification device 15, downstream of the NOx purification device 15. Detection signals from the sensors 18 and 19 are transmitted to the ECU 5. A characteristic of the O2 sensors 18 and 19 is that their outputs are drastically changed before and after the theoretical air-fuel ratio is employed: the outputs go to a high level on the rich side of the theoretical air-fuel ratio, and go to a low level on the lean side.

The engine 1 has a valve timing switching mechanism 30 that can alternate the valve timings for the air intake valve and the air exhaust valve between two levels: a quick valve timing that is appropriate for the fast rotational region of the engine, and a slow valve timing that is appropriate for the slow rotational region. The switching of the valve timing includes the switching of the lifting distance of the valves. And further, when the slow valve timing is selected, one of the two valves is halted, so that stable combustion is ensured even when the air-fuel ratio is lower than the theoretical air-fuel ratio.

The valve timing switching mechanism 30 employs hydraulic pressure to switch the valve timing. A solenoid and a hydraulic sensor for this switching are connected to the ECU 5. The detection signal emitted by the hydraulic sensor is transmitted to the ECU 5, which then controls the solenoid to switch to a valve timing that is consonant with the operating state of the engine 1.

The ECU 5 includes: an input circuit 5a, which has functions for shaping the waveform of a signal received from each sensor, for correcting and setting the voltage level to a predetermined level, and for converting an analog signal value into a digital signal value; a central processing unit (hereinafter referred to as a "CPU") 5b; a storage unit 5c for storing various operating programs that are performed and the results that are obtained by the CPU 5b; and an output circuit 5d for transmitting a drive signal to the fuel injection valve 6.

Based on the above described engine parameter signals, the CPU 5b determines various engine operating states, and in accordance with the determined engine operating state, employs equation (1) to calculate a fuel injection time TOUT for the fuel injection valve 6 that is opened in synchronization with the TDC signal pulse.

$$TOUT = TiM \times KCMD \times KLAF \times K1 + K2, \quad (1)$$

In this equation, TiM denotes a basic fuel volume, specifically, the basic fuel injection time for the fuel injection valve 6, and is determined by searching the Ti map that is set in accordance with engine revolutions NE and absolute air-intake-pipe internal pressure PBA. The Ti map is so set that the air-fuel ratio of a mixture to be supplied to an engine is substantially equal to the theoretical air-fuel ratio in an operating state that corresponds to the engine revolutions NE and the absolute air-intake-pipe internal pressure PBA.

KCMD denotes a target air-fuel ratio coefficient, and is set in accordance with engine parameters, such as the engine revolutions NE, the throttle valve travel θTH and the engine water temperature TW. Since the target air-fuel coefficient KCMD is proportional to the reciprocal of air-fuel ratio A/F, i.e., air-fuel ratio F/A, and has a value of 1.0 at the theoretical air-fuel ratio, the coefficient KCMD is also called a target equivalence ratio. Further, when a ratio increase provided by reproduction is to be executed, a process which will be described later, the target air-fuel ratio coefficient KCMD is set to a predetermined value KCMDR to increase the air-fuel ratio.

KLAF denotes an air-fuel ratio compensation coefficient that is calculated under PID control when the feedback control execution condition is established, so that the equivalence ratio KACT, which is obtained from a detection value of the LAF sensor 17, matches the target equivalence ratio KCMD.

K1 and K2 denote another compensation coefficient and a compensation variable that are obtained in accordance with various engine parameter signals, and are determined to be preset values, so that various characteristics, such as the fuel characteristics and engine acceleration characteristics that are consonant with the engine operating state, are optimized.

Based on the thus obtained fuel injection time TOUT, the CPU 5b transmits a drive signal, for opening the fuel injection valve 6, to the fuel injection valve 6 via the output circuit 5d.

Figure 2:
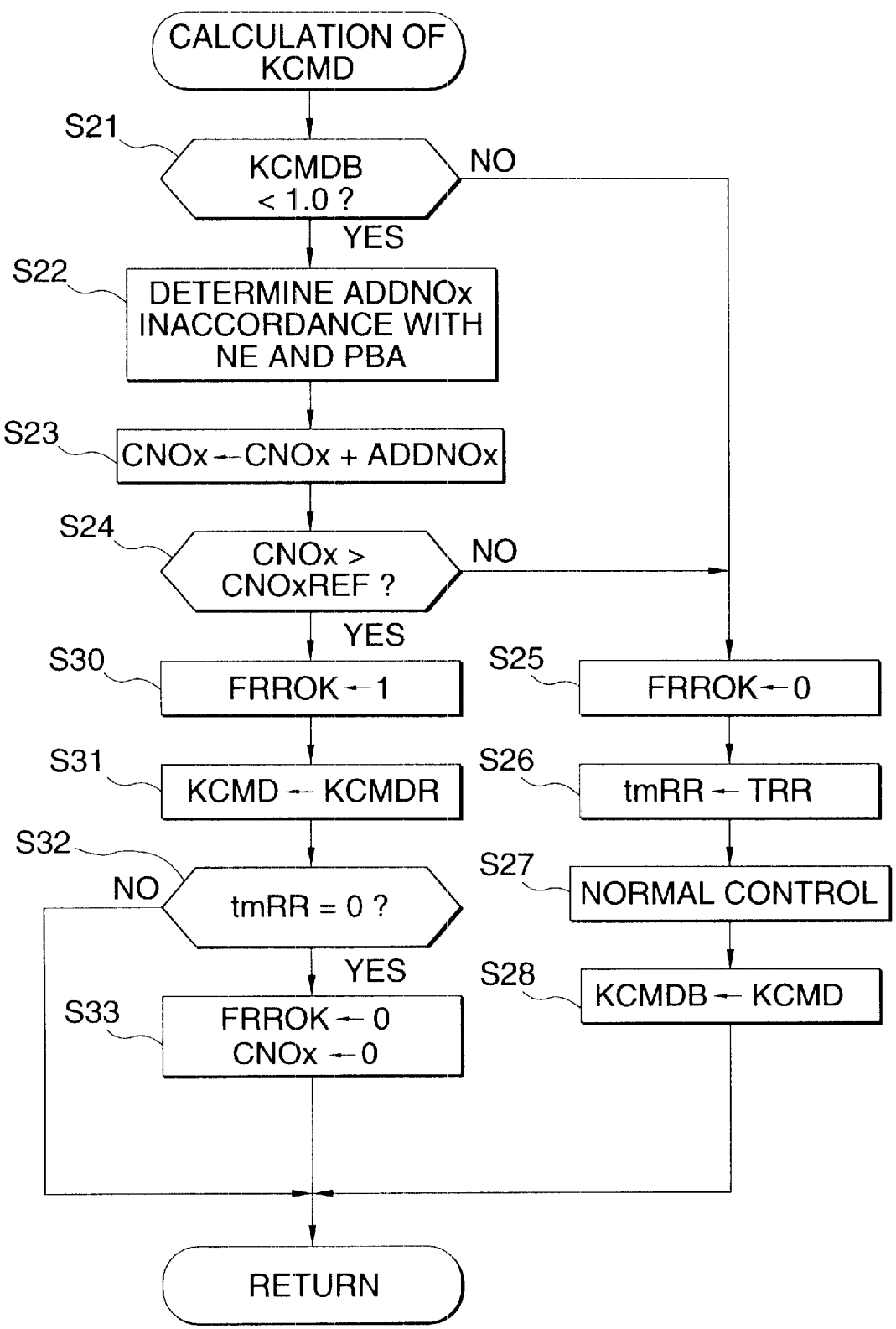
FIG. 2 is a flowchart showing the processing performed to calculate a target air-fuel ratio coefficient (KCMD)

FIG. 2 is a flowchart showing the processing performed to calculate the target air-fuel ratio coefficient KCMD used in equation (1). This processing is performed by the CPU 5b for each of a number of predetermined times.

At step S21, a check is performed to determine whether a lean operation is being executed, i.e., whether the value KCMDB of the target air-fuel ratio coefficient KCMD, which is stored under normal control at step S28 and which will be described later, is smaller than 1.0. When KCMDB is equal to or greater than 1.0 and a lean operation is not currently being performed, program control goes to step S25, and a rich flag FRROK, which currently is "1" and represents an increase by a reduction that is being performed, is changed to "0." Further, the time TRR (e.g., five to ten seconds) for the increase by the reduction is set in a down-count timer tmRR, which will later be referred to at step S32, and the timer is started (step S26). Following this, the target air-fuel ratio coefficient KCMD is set under normal control, i.e., in accordance with the engine operating state (step S27). The target air-fuel ratio coefficient KCMD is basically calculated in accordance with the engine revolutions NE and the absolute air-intake-pipe internal pressure PBA, and is changed to a value in accordance with the operating state when the engine water temperature TW is low, or when a predetermined high load is imposed. The target air-fuel ratio coefficient KCMD obtained at step S27 is stored as the value KCMDB (step S28), and the processing is thereafter terminated.

When, at step S21, the target air-fuel ratio coefficient KCMDB is smaller than 1.0 and a lean operation is being performed, an increase value ADDNOx, which is used at step S23, is determined in accordance with the engine revolutions NE and the absolute air-intake-pipe internal pressure PBA (step S22). The increase value ADDNOx is a parameter that corresponds to the volume of the NOx that is exhausted each unit hour during a lean operation. The value ADDNOx is increased in consonance with increases in the engine revolutions NE and the absolute air-intake-pipe internal pressure PBA.

At step s23, the increase value ADDNOx, which is determined at step S22, is employed to increment the NOx counter CNOx. As a result, the exhausted NOx volume, i.e., the count value that corresponds to the NOx volume that is absorbed by the NOx absorbent, is obtained.

$$CNOx=CNOx+ADDNOx$$

At step S24, a check is performed to determine whether the value of the NOx counter CNOx exceeds a permissible value CNOxREF. When the count value does not exceed the permissible value CNOxREF (NO), program control advances to step S25, and the target air-fuel ratio coefficient KCMD is set in consonance with normal control, i.e., the engine operating state. The permissible value CNOxREF is set to a value corresponding to an NOx volume that is slightly smaller than the maximum NOx absorption capacity of the NOx absorbent.

When, at step S24, the value of the counter CNOx exceeds the permissible value CNOxREF, the rich flag FRROK is set to "1" (step S30). Then, the target air-fuel ratio coefficient KCMD is set to a predetermined rich value KCMDR that corresponds to an air-fuel ratio of 14.0, and the increase by reduction is executed (step S31). A check is then performed to determine whether the value of the timer tmRR is "0" (step S32). When the value of the timer tmRR is greater than "0," the processing is immediately terminated, but when tmRR equals "0," the rich flag FRROK is set to "0" and the value held by the NOx counter CNOx is reset (step S33). Thus, since from now on the decision at step S24 is negative (NO), control of the operation is shifted to normal.

Figure 3:
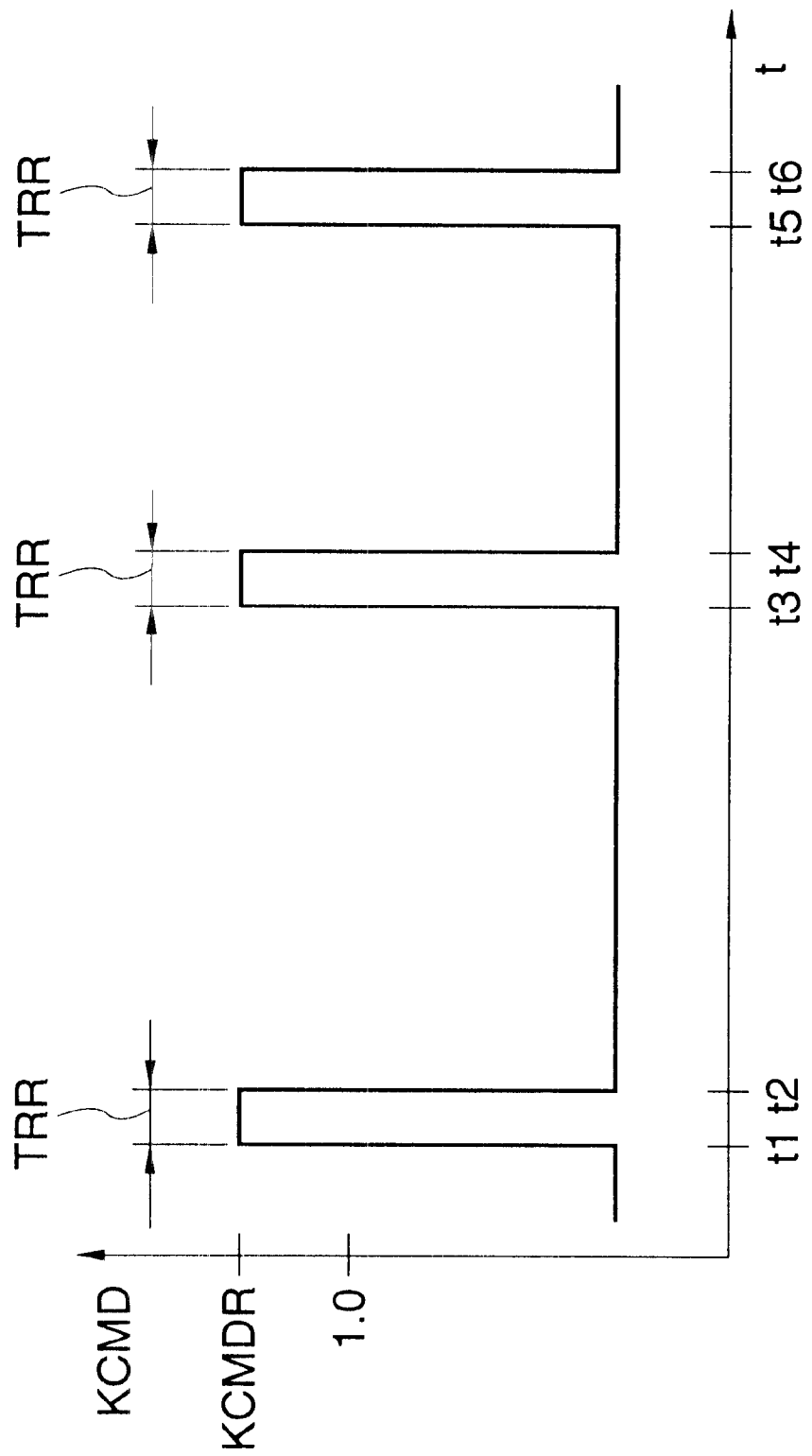
FIG. 3 is a time chart for explaining the setup of a target air-fuel ratio during a lean operation.

Through the processing in FIG. 2, in the engine operating state, wherein a lean operation is enabled, an increase by reduction is performed intermittently (periods of times t1 to t2, times t3 and t4, and times t5 and t6), as is shown in FIG. 3, so that the NOx that is absorbed by the NOx absorbent of the NOx purification device 15 is discharged as needed.

Figure 4:
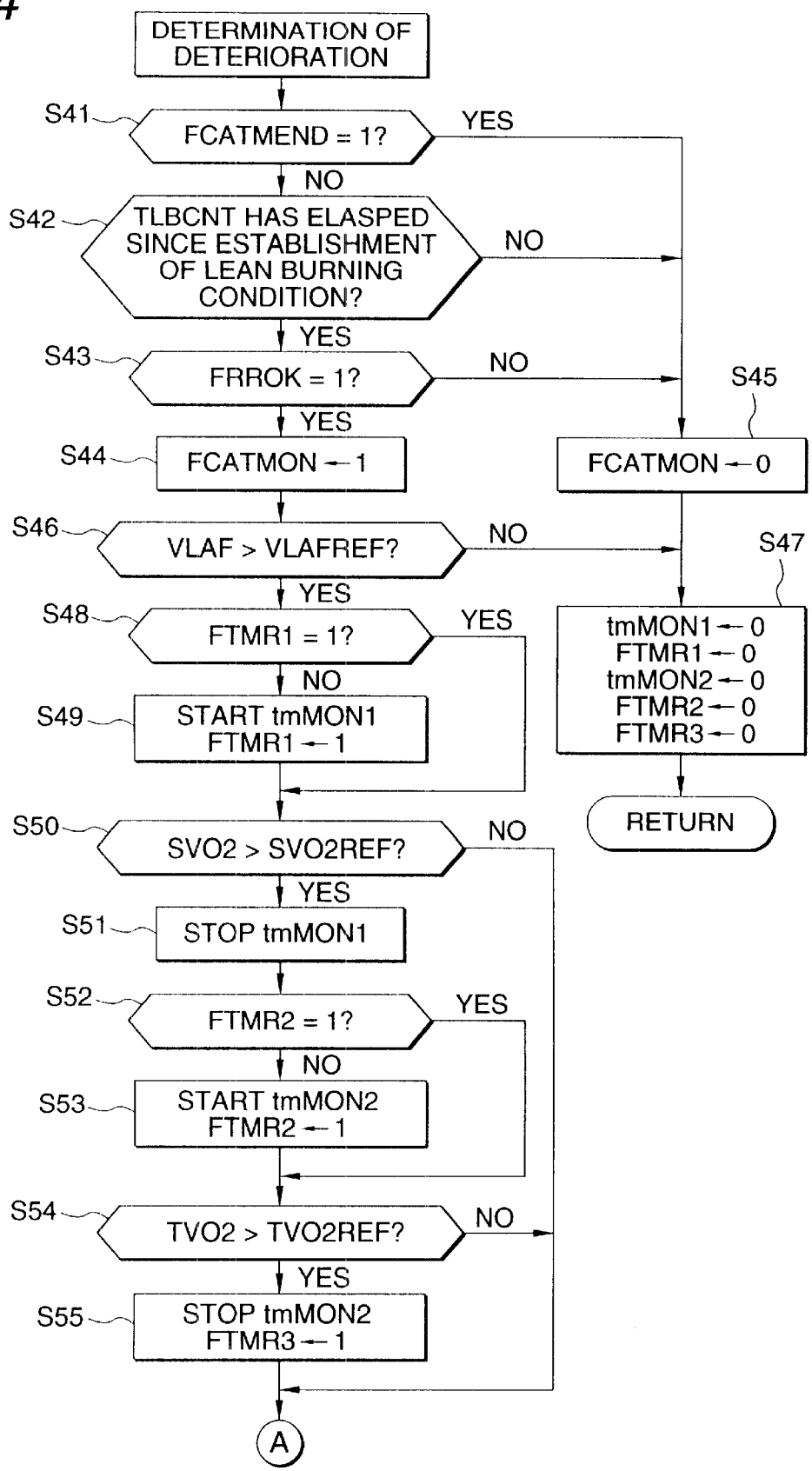
FIG. 4 is a flowchart showing the processing performed to determine the degree of deterioration of a three-way catalyst and a NOx purification device.
Figure 5:
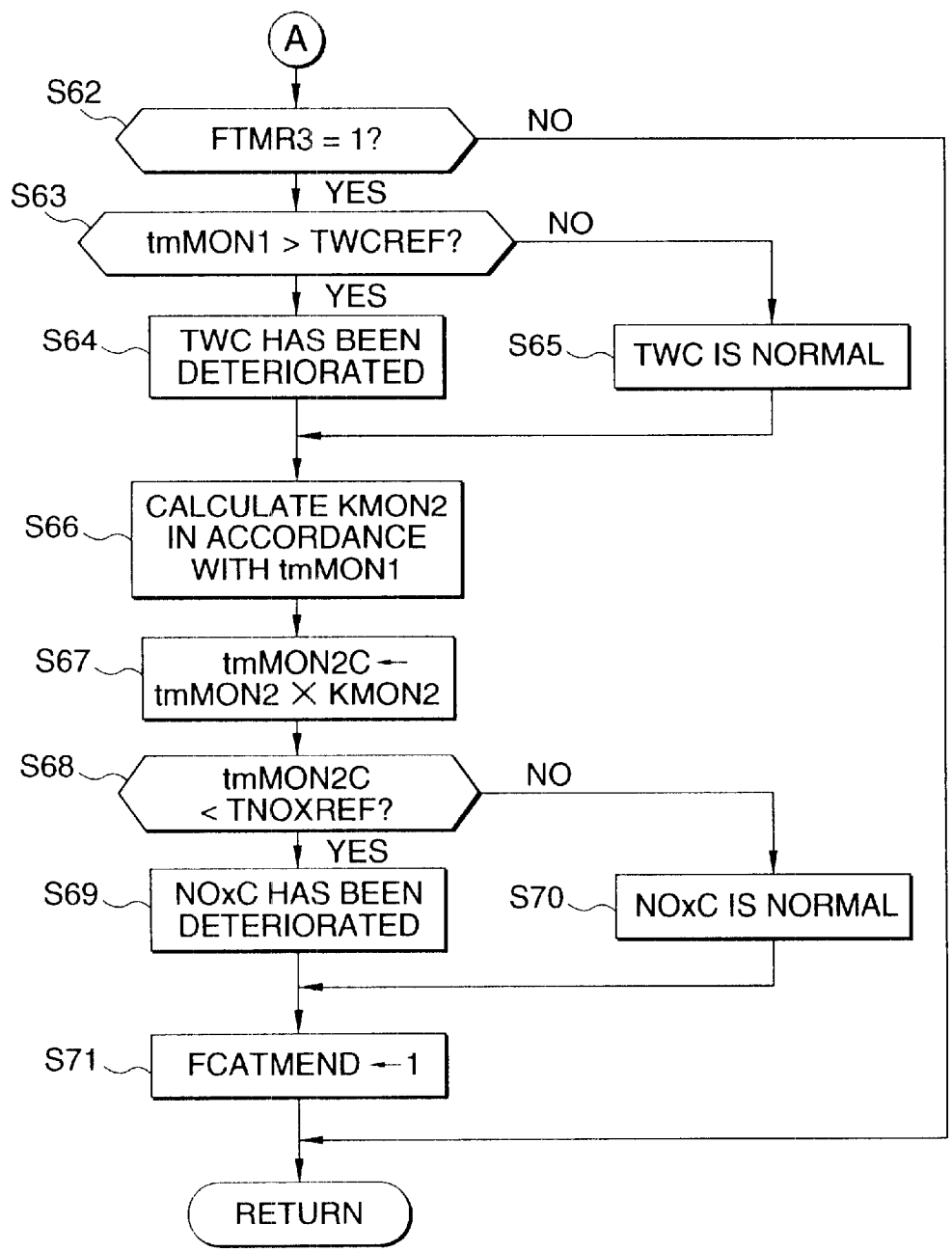
FIG. 5 is a flowchart showing the processing performed to determine the degree of deterioration of the three-way catalyst and the NOx purification device.

FIGS. 4 and 5 are flowcharts for the processing performed to evaluate the deterioration of the three-way catalyst 14 and the NOx purification device 15. This processing is performed at predetermined time intervals (e.g., 80 msec).

At step S41, a check is performed to determine whether an end flag FNOxMEND, which when set to "1" indicates that the deterioration evaluation processing has been completed, has been set to "1." When the end flag FNOxMEND has been set to "1," and the deterioration evaluation processing has been ended, program control goes to step S45. However, when the end flag FNOxMEND is set to "0," and the deterioration evaluation has not yet been completed, a check is performed to determine whether a predetermined time TLBCNT has elapsed since the lean operation execution condition was established (step S42). When the time TLBCNT has not elapsed, program control goes to step S45. But when the time TLBCNT has elapsed, a check is performed to determine whether the rich flag FRROK is set to "1" (step S43). When the rich flag FRROK is set to "0," and an increase by reduction has not been performed, program control goes to step S45, whereat a deterioration monitor flag FCATMON is set to "0" and a first up-counter timer tmMON1 and a second up-counter timer tmMON2, for the deterioration determination are set to "0." Further, a first timer operating flag FTMR1 and a second timer operating flag FTMR 2, which indicate when set to "1" that counting by the timer tmMON1 and the tmMON2 has begun, and a detection complete flag FTMR 3, which indicates when set to "1" that counting by these timers has been halted, are set to "0" (step S47). The processing is thereafter terminated.

When, at step S43, the rich flag FRROK is set to "1", and a increase by reduction is performed, the deterioration monitor flag FCATMON is set to "1" (step S44). And a check is then performed to determine whether an output value VLAF, of the LAF sensor 17, is greater than a predetermined output value VLAFREF (e.g., a value corresponding to the theoretical air-fuel ratio), i.e., the output value VLAF represents the rich air-fuel ratio (step S46). When the output value VLAF is equal to or smaller than the value VLAFREF, program control goes to step S47; and when the output value VLAF is greater than the value VLAFREF, program moves to step S48, whereat a check is performed to determine whether the first timer operating flag FTMR1 is set to "1." Since the flag FTMR1 is initially set to "0", the first timer tmMON1 is started, and the first timer operating flag FTMR1 is set to "1" (step S49). Program control then goes to step S50. And since the flag FTMR1 is thereafter set to "1", program control immediately moves from step S48 to step S50.

At step S50, a check is performed to determine whether an output value SVO2 of the O2 sensor 18 is greater than a predetermined output value SVO2REF, which is slightly greater than a value that is equivalent to the theoretical air-fuel ratio. Since initially the effect of the increase in the air-fuel ratio does not appear downstream of the three-way catalyst 14, the output value SVO2 is equal to or smaller than the value SVO2REF. Program control then goes to step S62, whereat a check is performed to determine whether the first timer operating flag FTMR1 is set to "0." So long as the value SVO2 is equal to or smaller than the value SVO2REF, the first timer operating flag FTMR1 is set to "1," and the decision at step S62 is negative (NO), so that the processing is immediately terminated.

However, when at step S50 the output value SVO2 is greater than the output value SVO2REF, the timer tmMON1 is halted (step S51), and a check is performed to determine whether the second timer operating flag FTMR2 is set to "1." Since initially the flag FTMR2 is set to "0," the second timer tmMON2 is started, and the second timer operating flag FTMR2 is set to "1" (step S53). Program control thereafter goes to step S54, because since in the following process the flag FTMR2 is set to "1," program control immediately jumps from step S52 to S54.

At step S54, a check is performed to determine whether a value TVO2 output by an O2 sensor 19 is greater than a predetermined output value TVO2REF, which is slightly greater than a value corresponding to the theoretical air-fuel ratio. Since initially the effect provided by the increase of the air-fuel ratio does not appear downstream of the NOx purification device 15, the output value TVO2 is equal to or smaller than the value TVO2REF. Program control thereafter goes to step S62, whereat the detection complete flag FTMR3 is set to "1." So long as the value TVO2 is equal to or smaller than the value TVO2REF, the detection complete flag FTMR3 is set to "0," and the decision at step S62 is negative (NO). As a result, the processing is immediately terminated.

When, at step S54, the value TVO2 exceeds the value TVO2REF, the timer tmMON2 is halted, and the detection complete flag TMR3 is set to "1". (step S55). Program control then moves to step S62. Since at this time the decision at step S62 is affirmative (YES), program control advances to step S63, whereat a check is performed to determine whether the value of the first timer tmMON1 is smaller than the first reference time TWCREF. Since the value of the timer tmMON1 is smaller, it is ascertained that deterioration of the three-way catalyst 14 has occurred, i.e., the degree of the deterioration of the three-way catalyst 14 is large. Therefore, when the value of the timer tmMON1 is greater than the reference time TWCREF, it is ascertained that the three-way catalyst 14 is normal (step S65). And when the value of the timer tmMON1 is equal to or smaller than the reference time TWCREF, it is ascertained that deterioration of the three-way catalyst 14 has occurred (step S64). Program control thereafter goes to step S66.

Figure 6:
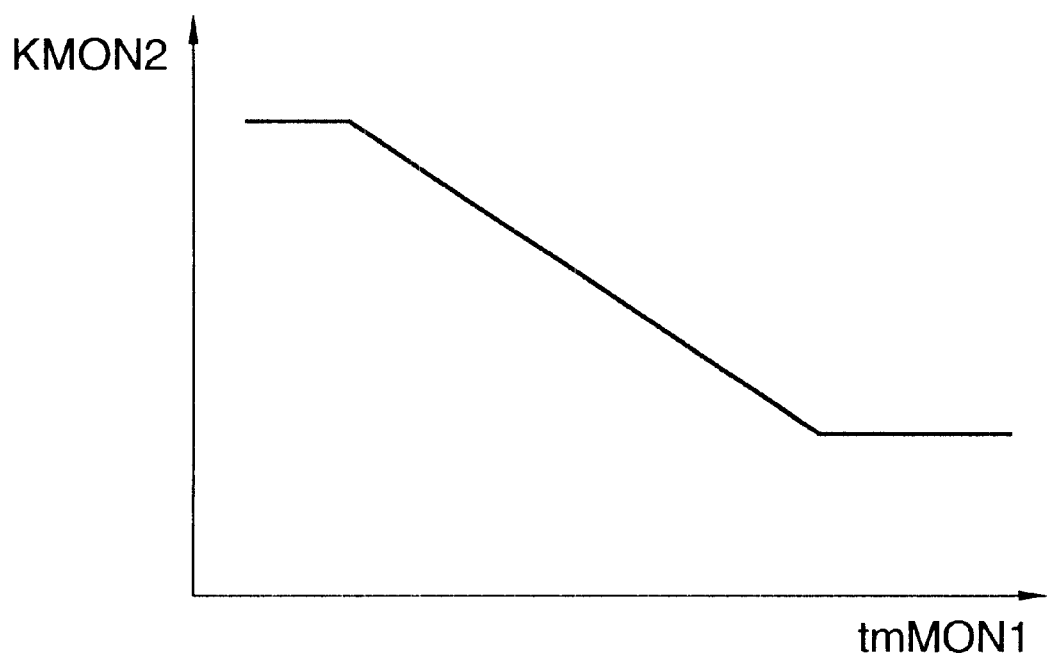
FIG. 6 is a diagram showing a table used for the processing in FIG. 5.

At step S66, a KMON2 table in FIG. 6 is searched in accordance with the value held by the first timer tmMON1, and a correction coefficient KMON2 is obtained. The KMON2 table is so designed that the correction coefficient KMON2 is increased in consonance with a reduction in the value of the first timer tmMON1, i.e., as the degree of deterioration of the three-way catalyst 14 is increased. At step S67, the value of the second timer tmMON2 is multiplied by the correction coefficient KMON2 to obtain a corrected timer value tmMON2C. A check is then performed to determine whether the corrected timer value tmMON2C is smaller than the second reference time TNOxREF (step S68).

Since the value of the second timer tmMON2 is smaller, it is ascertained that additional deterioration of the NOx purification device 15 has occurred. And when the timer value tmMON2C is greater than the reference time TNOxREF, it is ascertained that the NOx purification device 15 is normal (step S70). Thereafter, when the value tmMON2C is equal to or smaller than the reference time TNOxREF, it is ascertained that deterioration of the NOx purification device 15 has occurred (step S69), and then an end flag FNOxMEND is set to "1" (step S71) and the processing is thereafter terminated.

The first reference time TWCREF is determined by experimentation, so that it can cope with a delay time when, for example, the oxygen storage capacity of the three-way catalyst 14 is reduced to 50% of that of a brand new product. The second reference time TNOxREF is also determined through experimentation, so that it can cope with a delay time when, for example, the NOx absorption capacity of the NOx absorbent is reduced to 50% of that of a brand new product.

Figure 7A:
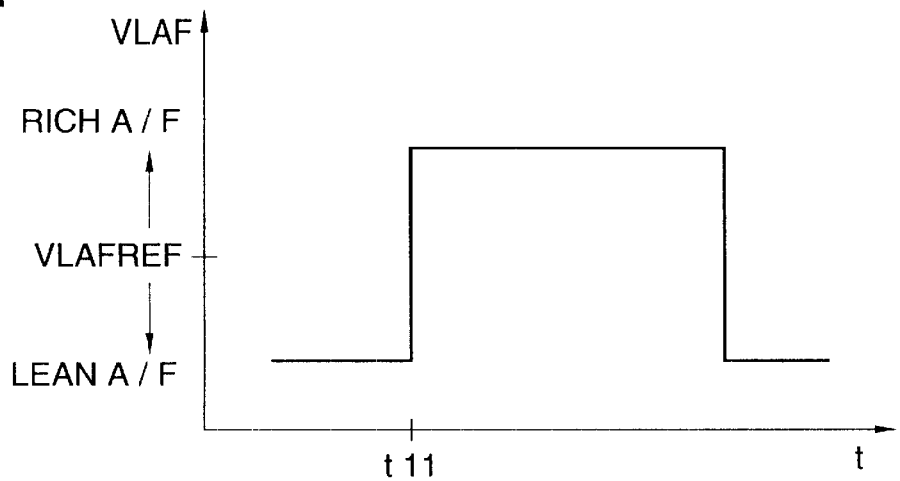
FIGS. 7A, 7B and 7C are time charts for explaining a change in the output value of an oxygen sensor and delay times (TMON1 and TMON2).
Figure 7B:
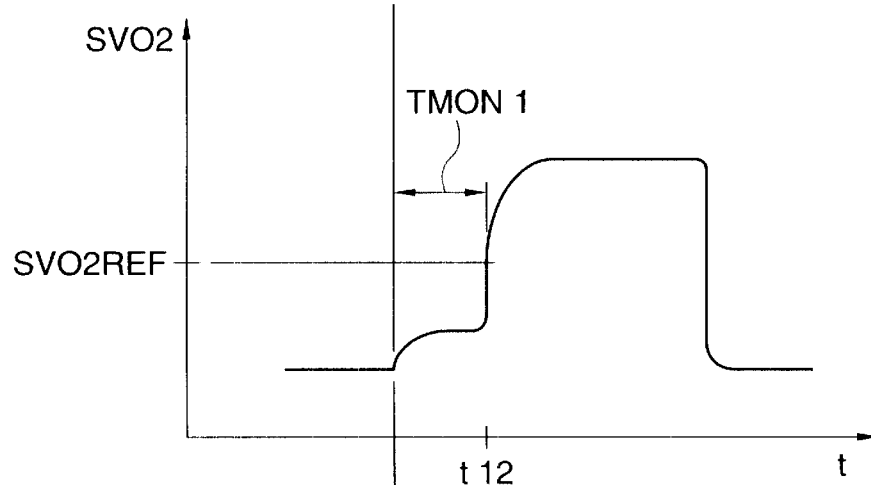
Figure 7C:
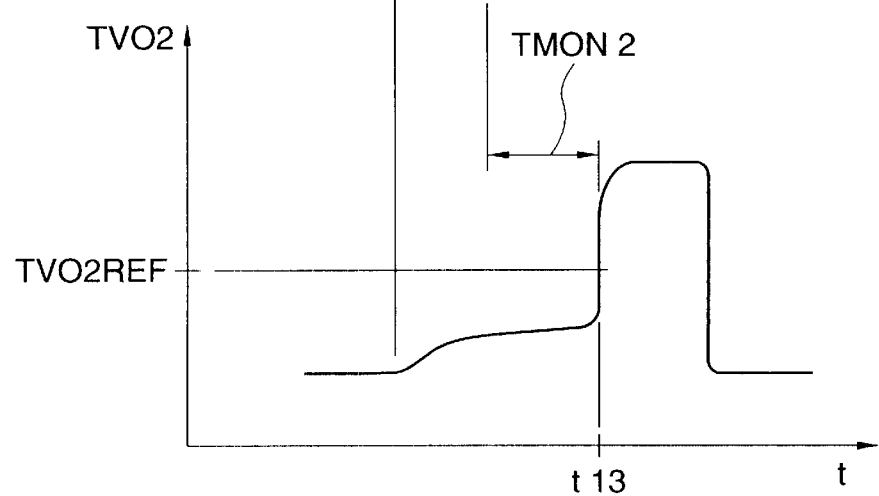

Through the processing in FIGS. 4 and 5, when the predetermined time TLBCNT has elapsed since the lean operation was started, and when an increase by reduction is performed after the NOx absorbent has absorbed enough NOx to detect the deterioration, as is shown in FIG. 7, the first timer tmMON1 measures a first delay time TMON1 that extends from the time t11, whereat the value LAF output by of the LAF sensor 17, which is located upstream of the three-way catalyst 14, exceeds the predetermined output value VLAFREF, to the time 12, whereat the output value SVO2 of the O2 sensor 18 located downstream of the three-way catalyst 14 exceeds the predetermined output value SVO2REF. In addition, the second timer tmMON2 measures a second delay time TMON2 that extends from the time 12, whereat the output value SVO2 of the O2 sensor 18 exceeds the predetermined output value SVO2REF, to the time tl3, whereat the output value TVO2 of the O2 sensor 19 located downstream of the NOx purification device 15 exceeds the predetermined output value TVO2REF. And when, for example, a determination reference for deterioration is set as the absorption capacity of a brand new absorbent, a satisfactory volume of NOx required for the detection of the deterioration of the NOx absorbent is a volume that exceeds 50% of the absorption capacity (maximum absorption volume) of the brand new absorbent.

The first delay time TMON1 is a parameter that represents the degree of deterioration of the three-way catalyst 14. The second delay time TMON2 is the time required for the discharge of all the NOx that has been absorbed by the NOx absorbent, and represents the NOx absorption capacity of the NOx absorbent. That is, since the NOx absorption capacity is reduced as the second delay time TMON2 becomes shorter, this fact can be employed to determine the degree of deterioration of the NOx purification device 15. In this embodiment, it is taken into account that the second delay time TMON2 is changed in accordance with the degree of the deterioration experienced by the three-way catalyst located upstream of the NOx purification device 15. Or more specifically, that, as the degree of the deterioration of the three-way catalyst 14 is increased, the reduction of the oxygen density downstream occurs earlier, and the densities of the HC and the CO that are assigned the reduction function are increased, so that, even when the same volume of NOx is absorbed by the NOx absorbent, the second delay time TMON2, which is required for the reduction, is reduced. Based on this consideration, the timer value tmMON2 (second delay time TMON2) is corrected by using the correction coefficient KMON2, and when the corrected timer value tmMON2C is smaller than the reference time TNOxREF, it is ascertained that deterioration of the NOx absorbent has occurred. Therefore, the degree of deterioration of the NOx purification device 15 can be precisely determined regardless of the degree of deterioration of the three-way catalyst 14.

In this embodiment, the second delay time TMON2 is corrected in accordance with the degree of deterioration of the three-way catalyst that is located upstream of the NOx purification device 15, and the deterioration of the NOx purification device 15 is determined by using the corrected delay time. Therefore, the degree of deterioration can be precisely determined without being the result being affected by the degree of deterioration of the three-way catalyst 14.

In this embodiment, the O2 sensors 18 and 19 correspond to the first and the second oxygen sensors, and the LAF sensor 17 corresponds to the third oxygen sensor. Steps S46 to S51 in FIG. 4 correspond to the first deterioration determination means, and steps S50 and S52 to S55 in FIG. 4 and steps S66 to S70 in FIG. 5 correspond to the second deterioration determination means. The second delay time TMON2 corresponds to the first determination means in the first aspect, and the first delay time TMON1 corresponds to the second determination time in the second aspect.

The present invention is not limited to this embodiment, and can be variously modified. In this embodiment, for example, the first and the second delay times TMON1 and TMON2, which are measured at the same time, are employed to effect a deterioration determination. However, it is preferable that the first and the second delay times TMON1 and TMON2 be measured a plurality of times, e.g., ten times, and that the average values be employed for the determination.

Another well known method, such as the method disclosed in JP-A-6-212955, may be employed to determine the degree of deterioration of the three-way catalyst 14.

In the embodiment, the second delay time TMON (tmMON2) is corrected in accordance with the degree of deterioration of the three-way catalyst 14. But instead, the second reference time TNOXREF may be corrected in accordance with the degree of deterioration of the three-way catalyst 14. In this case, the second reference time TNOxREF is so corrected that it is reduced as deterioration of the three-way catalyst progresses.

When the predetermined rich value KCMDR used to perform an increase by reduction is changed in accordance with the engine operating state, the delay times TMON1 and TMON2 are varied in accordance with the value KCMDR. Therefore, it is preferable that as the rich value KCMDR is increased, the reference times TWCREF and TNOXREF, which are used for a deterioration determination, be set to small values.

In the embodiment, the proportional air-fuel ratio sensor (oxygen sensor) 17 is provided upstream of the three-way catalyst 14, and the binary oxygen sensors 18 and 19 are provided upstream and downstream of the NOx purification device 15. However, arbitrary oxygen sensor types and arrangements may be employed. For example, all the oxygen sensors may be either proportional or binary.

As is described above, according to the invention of the first aspect, the degree of deterioration of the nitrogen oxide purifying means is determined in consonance with the degree of deterioration of the three-way catalyst, which is located upstream of the nitrogen oxide purifying means, and the first determination time, extending from the time whereat, after a lean exhaust-gas state is shifted to a rich exhaust-gas state by increasing the air-fuel ratio of a mixture to be supplied to an internal combustion engine, the output value of the first oxygen sensor is changed to a value indicative of a rich air-fuel ratio and terminating at the time whereat the output value of the second oxygen sensor equals a value indicative of a rich air-fuel ratio. Therefore, the degree of deterioration of the nitrogen oxide purifying means can be precisely determined, regardless of the degree of deterioration of the three-way catalyst.

According to the invention of the second aspect, the degree of deterioration of the three-way catalyst is determined based on the second determination time that extends from the time whereat, after the air-fuel ratio has been increased, the output value of the third oxygen sensor is changed to a value indicative of a rich air-fuel ratio, and terminating at the time whereat the output value of the first oxygen sensor equals the value that is indicative of a rich air-fuel ratio. Therefore, not only the degree of deterioration of the nitrogen oxide purifying means, but also the degree of deterioration of the three-way catalyst can be determined.

What is claimed is:

1. An exhaust-gas purification device for an exhaust system of an internal combustion engine, comprising:

nitrogen oxide purifying means for absorbing nitrogen oxide in exhaust gases during a lean exhaust-gas condition;

a three-way catalyst disposed upstream of said nitrogen oxide purifying means;

a first oxygen sensor, disposed between said nitrogen oxide purifying means and said three-way catalyst, for detecting a first oxygen density in said exhaust gases;

a second oxygen sensor, disposed downstream of said nitrogen oxygen purifying means, for detecting a second oxygen density in said exhaust gas;

first deterioration determination means, for determining a degree of deterioration of said three-way catalyst; and second deterioration determination means, for evaluating deterioration of said nitrogen oxide purifying means, from the degree of deterioration of said three-way catalyst determined by said first deterioration determination means and a first determination time period, said first determination time period being after a lean air-fuel ratio of the exhaust gases has been shifted to a rich air-fuel ratio by an decrease in the air-fuel ratio of a mixture to be supplied to the internal combustion engine, said first determination time period being from a time when a value output by first oxygen sensor changes to a value indicating a rich air-fuel ratio until a time when a value output by said second oxygen sensor changes to a value indicating a rich air-fuel ratio.

2. An exhaust-gas purification device for an exhaust system of an internal combustion engine, comprising:

nitrogen oxide purifying means for absorbing nitrogen oxide in exhaust gases during a lean exhaust-gas condition;

a three-way catalyst disposed upstream of said nitrogen oxygen purifying means;

a first oxygen sensor, disposed between said nitrogen oxide purifying means and said three-way catalyst, for detecting a first oxygen density in said exhaust gases;

a second oxygen sensor, disposed downstream of said nitrogen oxygen purifying means, for detecting a second oxygen density in said exhaust gas;

first deterioration determination means, for evaluating deterioration of said three-way catalyst;

second deterioration determination means, for evaluating deterioration of said nitrogen oxide purifying means, based on the deterioration of said three-way catalyst and based on a first determination time period, said first determination time period being after a lean air-fuel ratio of the exhaust gases has been shifted to a rich air-fuel ratio by an decrease in the air-fuel ratio of a mixture to be supplied to the internal combustion engine, said first determination time period being from a time when a value output by first oxygen sensor changes to a value indicating a rich air-fuel ratio until a time when a value output by said second oxygen sensor changes to a value indicating a rich air-fuel ratio; and a third oxygen sensor, disposed upstream of said three-way catalyst, for detecting a third oxygen density in said exhaust gases;

wherein said first deterioration means evaluates a degree of deterioration of said three-way catalyst based on a second determination time, said second determination time being after the lean exhaust gas has been shifted to the rich air-fuel ratio gas, said second determination time being from a time when a value output by said third oxygen sensor is changed to a value indicative of the rich air-fuel ratio until the value output by said first oxygen sensor is changed to a value indicative of said rich air-fuel ratio.

3. The exhaust-gas purification device according to claim 1, wherein said first determination time period is measured a plurality of times and an average value of the plurality of determination time period measurements is employed as the first determination time period basis for said evaluating of the deterioration of said nitrogen oxide purifying means.

4. The exhaust-gas purification device according to claim 2, wherein said second determination time period is measured a plurality of times and an average value of the plurality of determination time period measurements is employed as the first determination time period basis for said evaluating of the deterioration of said nitrogen oxide purifying means.

5. An exhaust-gas purification device for an exhaust system of an internal combustion engine, comprising:
   a nitrogen oxide purifier operative to absorb nitrogen oxide in exhaust gases during a lean exhaust-gas condition;
   a three-way catalyst disposed upstream of said nitrogen oxide purifier;
   a first oxygen sensor, disposed between said nitrogen oxide purifier and said three-way catalyst, for detecting a first oxygen density in said exhaust gases;
   a second oxygen sensor, disposed downstream of said nitrogen oxide purifier, for detecting a second oxygen density in said exhaust gases;
   a first deterioration determinator operative to determine a degree of deterioration of said three-way catalyst and generate three-way catalyst deterioration information; and
   a second deterioration determinator operative to evaluate deterioration of said nitrogen oxide purifier, from said degree of deterioration of said three-way catalyst determined by said first deterioration determinator and a first determination time period that occurs after a lean air-fuel ratio of the exhaust gases has been shifted to a rich air-fuel ratio by an decrease in the air-fuel ratio of a mixture to be supplied to the internal combustion engine, said first determination time period being from a time at which a value output by said first oxygen sensor changes to a value indicating a rich air-fuel ratio until a value output by said second oxygen sensor changes to a value indicating a rich air-fuel ratio.

6. The exhaust-gas purification device according to claim 5, further comprising:
   a third oxygen sensor, disposed upstream of said three-way catalyst, for detecting a third oxygen density in said exhaust gases;
   wherein said first deterioration determinator is operative to determine a degree of deterioration of said three-way catalyst based on a second determination time period that extends, after the lean exhaust gases have been shifted to the rich air-fuel ratio gases, from a time when a value output by said third oxygen sensor is changed to a value indicative of a rich air-fuel ratio until a value output by said first oxygen sensor is changed to a value indicative of the rich air-fuel ratio.

7. The exhaust-gas purification device according to claim 5, wherein said first determination time period is measured a plurality of times and an average value of the plurality of measurements is employed for the evaluation by said second deterioration determinator.

8. The exhaust-gas purification device according to claim 6, wherein said second determination time period is measured a plurality of times and an average value of the plurality of measurements is employed by said first deterioration determinator to determine said degree of deterioration of said three-way catalyst.

9. The exhaust-gas purification device according to claim 5, wherein said second deterioration determinator is further operative to correct said first determination time period based on the degree of deterioration of said three-way catalyst.

10. The exhaust-gas purification device according to claim 9, wherein, when said corrected first determination time period is less than a reference time, said second deterioration determinator determines that deterioration of said nitrogen oxide purifier has reached a first deterioration level.

11. The exhaust-gas purification device according to claim 10, wherein said reference time is set so that it equals a time that corresponds to when a purifying capacity of said nitrogen oxide purifier is 50% of a brand new purifying capacity.

12. The exhaust-gas purification device according to claim 5, wherein said second deterioration determinator is further operative to correct a reference time, wherein, when said first determination time period is less than said corrected reference time, said second deterioration determinator determines that deterioration of said nitrogen oxide purifier has reached a second deterioration level.

13. The exhaust-gas purification device according to claim 5, wherein said first deterioration determinator generates a three-way catalyst deterioration value that is proportional to said degree of deterioration of said three-way catalyst, the three-way catalyst deterioration value being time-based.

14. The exhaust-gas purification device according to claim 5, wherein a degree of deterioration of said nitrogen oxide purifier is based on said degree of deterioration of said three-way catalyst.

* * * * *